United States Patent
Kuntze-Fechner et al.

(10) Patent No.: US 9,623,963 B2
(45) Date of Patent: Apr. 18, 2017

(54) PARTLY CRUCIFORM FLEXBEAM AND METHOD OF MANUFACTURING SUCH A FLEXBEAM

(71) Applicant: AIRBUS HELICOPTERS DEUTSCHLAND GMBH, Donauworth (DE)

(72) Inventors: Gerald Kuntze-Fechner, Gmund am Tegernsee (DE); Martin Ortner, Unterhaching (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 573 days.

(21) Appl. No.: 14/190,546

(22) Filed: Feb. 26, 2014

(65) Prior Publication Data
US 2014/0241885 A1    Aug. 28, 2014

(30) Foreign Application Priority Data
Feb. 27, 2013    (EP) .................................... 13400002

(51) Int. Cl.
*B64C 27/04*    (2006.01)
*B64C 27/33*    (2006.01)

(52) U.S. Cl.
CPC .............. *B64C 27/04* (2013.01); *B64C 27/33* (2013.01); *Y10T 29/4932* (2015.01)

(58) Field of Classification Search
CPC ....... B64C 27/33; B64C 27/48; B64C 27/327; B64C 27/473; B64C 27/40; B64C 27/38; B64C 2027/4736
See application file for complete search history.

(56) References Cited

U.S. PATENT DOCUMENTS

| | | | | |
|---|---|---|---|---|
| 3,261,407 A | * | 7/1966 | Culver | ................... B64C 27/33 416/112 |
| 3,695,779 A | * | 10/1972 | Kastan | ................. B64C 27/327 416/135 |
| 3,791,234 A | * | 2/1974 | Kastan | ................. B64C 27/327 416/141 |
| 4,352,631 A | | 10/1982 | Buchs et al. | |
| 4,427,340 A | | 1/1984 | Metzger et al. | |

(Continued)

FOREIGN PATENT DOCUMENTS

| | | |
|---|---|---|
| EP | 0019041 | 11/1980 |
| EP | 0315962 | 5/1989 |

OTHER PUBLICATIONS

Extended European Search Report for EP 13400002.5, Completed by the European Patent Office, Dated Aug. 27, 2013, 7 Pages.

(Continued)

*Primary Examiner* — Jason L Vaughan
(74) *Attorney, Agent, or Firm* — Brooks Kushman P.C.

(57) ABSTRACT

A partly cruciform flexbeam (1) of a bearingless main rotor system of a helicopter with a hub drive and an airfoil blade. The partly cruciform flexbeam (1) comprises a flexbeam head (2) with a flat bearing laminate at one end, a root end (3) opposed to said flexbeam head (2) and a flexbeam body (6) between said flexbeam head (2) and said root end (3), said flexbeam body (6) being torsion soft with a substantially cruciform cross section. The invention is as well related to a method of manufacturing such a partly cruciform flexbeam (1).

6 Claims, 2 Drawing Sheets

(56) References Cited

U.S. PATENT DOCUMENTS

| | | | | |
|---|---|---|---|---|
| 4,650,401 | A | * | 3/1987 | Yao ........................ B64C 27/33 416/134 A |
| 4,696,623 | A | * | 9/1987 | Bost ................... B29D 99/0025 416/226 |
| 4,746,272 | A | * | 5/1988 | Noehren ................. B64C 27/33 416/134 A |
| 4,892,461 | A | * | 1/1990 | Matsumoto ........... B29C 70/345 416/134 A |
| 4,898,515 | A | * | 2/1990 | Beno .................... B29C 70/083 416/134 A |
| 5,096,380 | A | | 3/1992 | Byrnes et al. |
| 5,228,834 | A | * | 7/1993 | Yamamoto ............... B64C 27/33 416/131 |
| 5,358,381 | A | * | 10/1994 | Covington .............. B29C 70/86 416/134 A |
| 5,738,494 | A | | 4/1998 | Schmaling |
| 6,004,099 | A | * | 12/1999 | Bansemir ................ B64C 27/33 416/230 |
| 6,375,426 | B1 | * | 4/2002 | Brack ..................... B64C 27/33 156/94 |
| 6,708,921 | B2 | * | 3/2004 | Sims ....................... B64C 27/33 244/17.11 |
| 8,662,847 | B2 | * | 3/2014 | Kuntze-Fechner ..... B64C 27/33 416/134 A |
| 8,834,128 | B2 | * | 9/2014 | Kuntze-Fechner ... B29C 70/545 416/230 |
| 8,858,178 | B2 | * | 10/2014 | Kuntze-Fechner ... B29C 70/545 416/134 A |
| 9,457,897 | B2 | * | 10/2016 | Sutton ..................... B64C 27/33 |
| 9,499,262 | B2 | * | 11/2016 | Foskey .................. B64C 27/33 |
| 2014/0241885 | A1 | * | 8/2014 | Kuntze-Fechner ..... B64C 27/33 416/134 A |
| 2015/0203198 | A1 | * | 7/2015 | Pfaller ................... B64C 27/32 416/134 A |
| 2016/0159474 | A1 | * | 6/2016 | Pfaller ................... B64C 27/33 416/134 A |

OTHER PUBLICATIONS

Buchs et al. Vertica 1987, vol. 11, No. 3, p. 407-424, "Structural Design and Analysis Aspects of Composite Helicopter Components."

\* cited by examiner

A-A

B-B

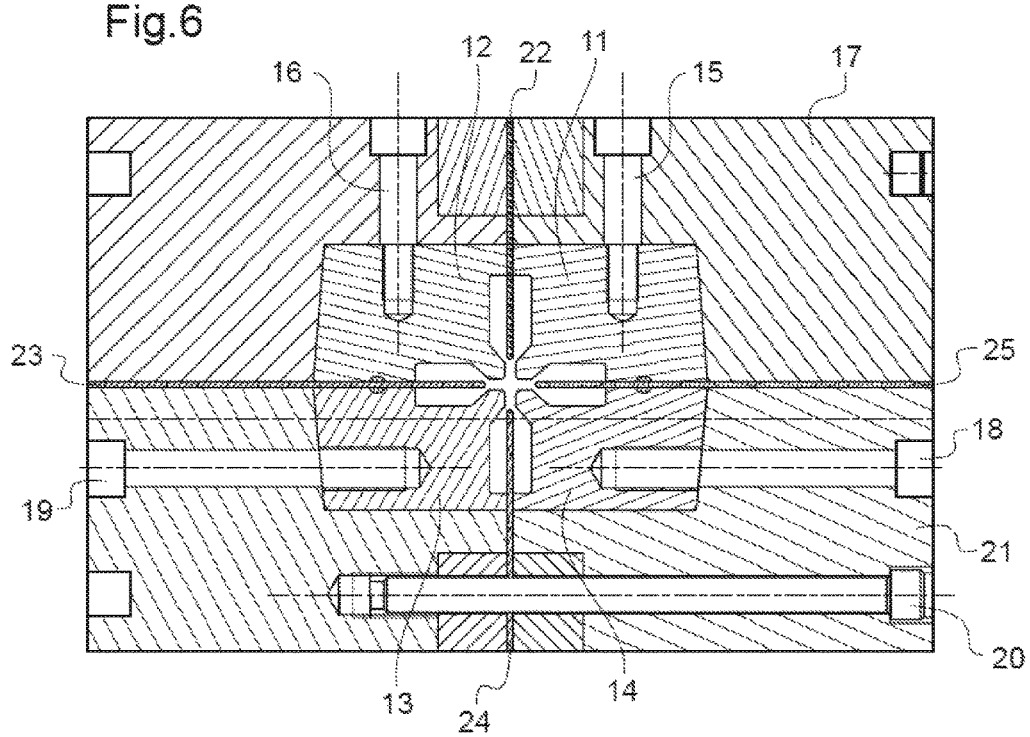
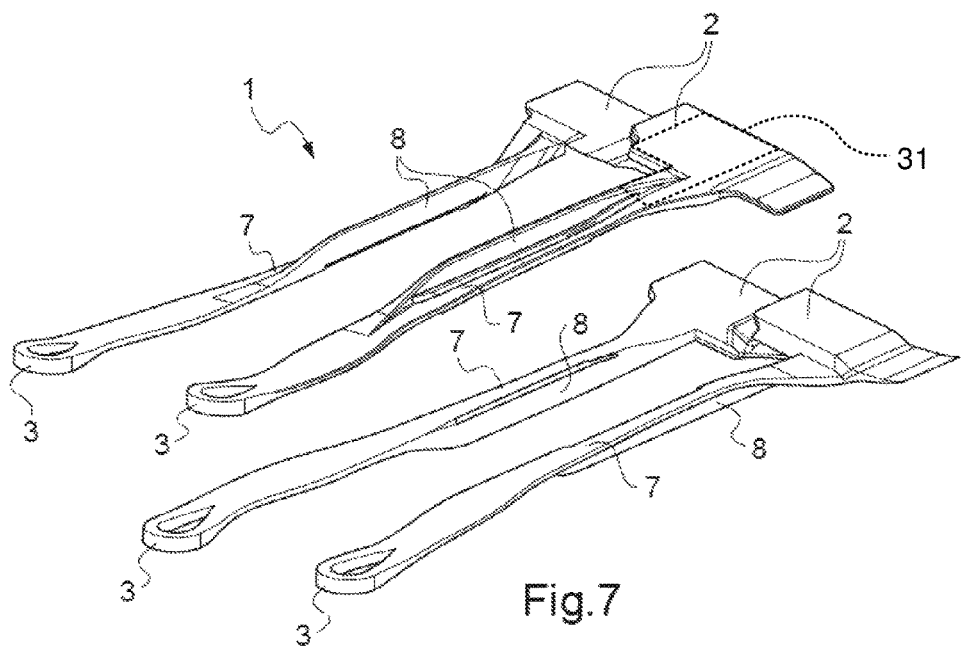

PARTLY CRUCIFORM FLEXBEAM AND METHOD OF MANUFACTURING SUCH A FLEXBEAM

CROSS REFERENCE TO RELATED APPLICATION

This application claims priority to European patent application No. 13 400002.5 filed Feb. 27, 2013, the disclosure of which is incorporated in its entirety by reference herein.

BACKGROUND OF THE INVENTION (1) Field of the Invention

The invention is related to a partly cruciform flexbeam of a bearingless main rotor system of a helicopter with the features of the preamble of claim 1 and to a method of manufacturing such a partly cruciform flexbeam with the features of the preamble of claim 5.

(2) Description of Related Art

During operation, the rotor blades of a helicopter are deflected in various directions and are thereby subjected to high loads in these various directions. The rotor blades must be designed to withstand these high loads while still providing the required flexibility or articulation to allow the blades to carry out flapping, lead-lag oscillating and pitch angle variation movements.

Typically, a rotor blade of a bearingless rotor includes a structural element known as a flexbeam at the inner end of the blade for connection to the rotor head. The flexbeam supports and transmits the centrifugal forces of the blade into the rotor hub. Additionally, the flexbeam includes at least portions or regions that are flexural and torsion soft or flexible to allow the blade to undergo the above mentioned movements in a flapping direction, a lead-lag direction and in a pitch angle direction. The torsion soft portion of the flexbeam is arranged within a torsion stiff control cuff or torque tube, transmitting the pitch angle control movements to the lift-generating airfoil blade portion of the rotor blade. The airfoil blade typically extends from the outboard end of the control cuff to the outermost end of the rotor blade, i.e. the blade tip. Nowadays flexbeams are made of composite materials.

The vibrations of the rotor blades, and particularly the oscillations in the lead-lag direction, must be damped by appropriate damping elements. Any softness or lack of force transmission through the blade/cuff attachment to the damping element will reduce the overall resulting damping effect.

In order to allow the flexbeam/cuff unit and/or the airfoil blade to be separately manufactured and/or replaced in the event of damage, or in order to allow the airfoil blade to be pivoted and folded relative to the flexbeam/cuff unit, it is desired to provide a separable or releasable junction between the flexbeam/cuff unit and the lift-generating airfoil blade.

The flexbeam is subject to high technical and mechanical demands, because it must reliably carry and transmit the substantially high centrifugal forces resulting during rotation of the rotor blade and it must reliably carry and transmit all bending moments from flapping and lead lag movements of the rotor blade. The rotor blade has a longitudinal main load axis next to 25% of the average airfoil chord of the blade profile, said main load axis being in practice essentially identical with the pitch axis of said rotor blade. At the level of the flexbeam said longitudinal main load axis next to 25% of the average airfoil chord of the blade profile corresponds to a longitudinal middle axis of the flexbeam.

An efficient transmission of the lead lag moments from the airfoil blade into the flexbeam/control cuff and the lift-generating airfoil blade allows high damping effectiveness of the lead lag damping elements at the rotor hub and thus allows smaller, lighter and cheaper damping elements. An efficient transmission of the lead lag moments needs a flexbeam with a distinct lead lag joint. Such a distinct lead lag joint leads to a cross section of the flexbeam at the releasable junction between the flexbeam and the lift-generating airfoil blade that is high and slim whereas the lead lag joint of the flexbeam needs to be large and low towards the rotor hub. A continuous geometry of the flexbeam from the releasable junction with the lift-generating airfoil blade to the releasable junction with the rotor hub is varying along the longitudinal middle axis of the flexbeam and said continuous geometry of the flexbeam is therefore complicated and a challenge with regard to production of the flexbeam.

The high cross section of the flexbeam at the releasable junction between the flexbeam and the lift-generating airfoil blade causes relatively high aerodynamic resistance and thus a high need of performance of the main rotor system. There are essentially two ways to reduce said high aerodynamic resistance:

1. Positioning the releasable junction between the flexbeam and the lift-generating airfoil blade as close as possible to the rotor hub, implying a short flexbeam with the consequence that the geometry of the flexbeam is further complicated in order to provide a short flexbeam with allowable shear stresses in the resins carrying most of the shear stresses of the composites.

2. Designing the releasable junction aerodynamically as favorable as possible. An aerodynamic favorable junction may be provided with a flexbeam head of bearing laminate.

The document U.S. Pat. No. 5,738,494 A discloses an optimized composite flexbeam having a plurality of adjoining regions including a hub attachment region, a blade attachment region, a pitch region, an outboard transition region disposed between and adjoining the pitch region and blade attachment regions, and an inboard transition region disposed between and adjoining the pitch and hub attachment regions. The inboard transition region includes a first transition subregion and a second transition subregion wherein the second transition subregion defines a width conic and a critical width transition subregion. Furthermore, the first and second inboard transition regions are composed of a combination of unidirectional and off-axis composite materials wherein the off-axis composite material defines a percentage of off-axis composite material and wherein the percentage in the critical transition subregion is defined by an optimized curve.

The document EP 0315962 A2 discloses a helicopter rotor blade supported by a flexbeam to be rotatable about an axis of rotation, in which a pitching motion thereof is allowable. The rotor blade is provided with a device for changing the pitch and damping the lead-lag motion thereof. The device comprises a bushing in a hole formed at the inboard end of the flexbeam, an elastomeric pivot loosely fitted in the bushing, elastomeric dampers of cylindrical shape mounted on the upper and lower surfaces of the flexbeam and coupled with the upper and lower ends of the elastomeric pivot by means of nuts, and torque arms extending through the bushing and the elastomeric dampers and having the central portion thereof connected to central shafts of the elastomeric pivots. Each of the pitch sleeves has both ends outwardly projecting beyond the elastomeric dampers and secured to a pitch sleeve which encloses the flexbeam. Therefore, the relative position between the pitch sleeve and the elastomeric pivot does not change even when lead-lag motion is imparted to the rotor blade.

U.S. Pat. No. 5,096,380 A discloses a flexbeam for a bearingless helicopter rotor with a composite beam, composed of unidirectional fibers bound in an epoxy matrix, having ribs, composed of unidirectional fibers bound in a urethane matrix, bonded to each horizontal face at the section of the beam which accommodates lead-lag torsion.

The document U.S. Pat. No. 4,427,340 A discloses helicopter rotors and more particularly rotor mounting involving a composite fiber-reinforced unitary yoke with resilient in plane restraints.

The document EP 0019041 A1 discloses a bearingless rotor, especially for helicopters, whereby the rotor has at least two rotor blades, each of which is secured to the rotor hub through a connecting element that functions as a flapping hinge, as a lead-lag hinge and as a torsion hinge. The connecting element is made of fiber compound material as an integral part of the rotor blade and extends between a blade root of the rotor blade and the rotor hub. The cross section of the connecting element can be cruciform with components that enclose right angles and that comprise shearing webs located in internal zones and tension belts that are located in outer zones. Furthermore, slots extending in the shearing webs of the components from the outer edge radially toward a shearing center or middle axis of the connecting element can be provided. Even in the tension belts, such slots may be provided extending toward or substantially toward the shearing center.

The flexbeams of the state of the art are relatively long with simple cross sections to allow simple tools for production at the cost of efficient lead lag kinematics.

BRIEF SUMMARY OF THE INVENTION

It is an object of the invention to provide an improved partly cruciform flexbeam of a bearingless main rotor system of a helicopter. It is a further object of the invention to provide a method of manufacturing such an improved partly cruciform flexbeam.

The solution is provided with a partly cruciform flexbeam of a bearingless main rotor system of a helicopter with the features of claim 1 of the invention and with a method of manufacturing such a partly cruciform flexbeam with the features of claim 5 of the invention.

According to the invention a bearingless main rotor system of a helicopter is provided with a hub drive and an airfoil blade and a partly cruciform flexbeam as a link between said hub drive and said airfoil blade. Said partly cruciform flexbeam comprises a flexbeam head with a flat bearing laminate at one end and a root end opposed to said flexbeam head. Said root end is adapted for releasable connection to the hub drive and said flexbeam head is adapted for releasable connection to the airfoil blade.

A flexbeam body is between said flexbeam head and said root end. Said flexbeam body is torsion soft with a substantially cruciform cross section of bars and fillets. Said bars are integral with and essentially perpendicular to said fillets and said bars are in line with said flexbeam head. Said flexbeam body is an assembly of four substructures, each with one bar integral with one essentially perpendicular fillet. Said four substructures are assembled along said longitudinal middle axis of the flexbeam with the respective bars and fillets pointing outward to result in said substantially cruciform, symmetric cross section with separations at least along said fillets. Said fillets and said bars are composed of a plurality of rovings. Said plurality of rovings extend all along the partly cruciform flexbeam from the root end to the entire flexbeam head or extend from at least beyond the separations along said fillets of the flexbeam body across said entire flexbeam head.

At least two L-shaped integral tissue layers are provided extending from in between the flexbeam body up to an entire width of the flexbeam head with the rovings in between. According to one advantage of the invention the torsion soft flexbeam allows the flexbeam to be as short as possible, i.e. to be as short as 10%-15% of the radius of the main rotor system, allowing a reduction of the overall weight of the bearingless main rotor system and an improved aerodynamic due to a longer airfoil blade. The flat bearing laminate for the junction of the flexbeam head to the airfoil blade further improves the aerodynamic profile. According to a further advantage of the invention the torsion soft flexbeam allows good lead lag kinematics.

According to a preferred embodiment of the invention said rovings from the fillet and the bar are scarfed or hafted towards said entire flexbeam head for improved adhesion of the flat bearing laminate in the flexbeam head.

According to a further preferred embodiment of the invention said at least two L-shaped integral tissue layers are alternating with the rovings of the flexbeam head for distribution of the loads into the flexbeam body by means of the rovings to reduce tensions at the interfaces of the layers.

According to a further preferred embodiment of the invention said at least two L-shaped integral tissue layers are formed integrally for high stiffness.

According to a preferred embodiment of the invention a method of manufacturing a partly cruciform flexbeam of a bearingless main rotor system of a helicopter is provided. Said flexbeam comprises a cruciform flexbeam body, a flat flexbeam head and a root end. Said method comprises the following steps: Providing at least two L-shaped integral tissue layers extending into the flexbeam body and up to the entire length and width of the flat flexbeam head. Providing four mold quarters, each with a mold for a bar and with a mold for a fillet of the cruciform flexbeam body.

Said mold of each of said four mold quarters for a bar is integral and essentially perpendicular to said mold for a fillet and said mold for a bar is essentially in line with said flat flexbeam head. Providing rovings with a length allowing coverage from at least beyond separations along said fillets of the flexbeam body across said flexbeam head and inserting some of said rovings into pairs of said still separated mold quarters to respectively mold the fillets of halves of a cruciform flexbeam body. Said pairs of mold quarters are joint along said inserted fillets with means to provide said separations in between the fillets along the cruciform flexbeam body and to respectively provide a common mold for the bars of a half of the cruciform flexbeam body.

Rovings are inserted respectively in the common mold for the bars of each of said pairs of joint mold quarters to respectively mold the bars of the halves of the cruciform flexbeam body. Scarfing or hafting respectively the rovings of the fillets and the bars of said pairs of joint mold quarters to layers covering up to the entire width of the flexbeam head and inserting alternately the L-shaped integral tissue layers between the scarfed rovings of the fillets and bars of each of said pairs of joint mold quarters.

Finally respectively two of said pairs of mold quarters are joint along the bars of said flexbeam body and along the rovings from said bars and/or fillets and/or L-shaped integral tissue layers of said flexbeam head in said respectively joint pairs of mold quarters. The inventive method allows production of the inventive flexbeam with separations along at least the fillets for adjustable torsion softness of the cruciform flexbeam body and subsequently for improved lead lag kinematics at low aerodynamic resistance.

According to a further preferred embodiment of the invention supplemental separations are provided in between the bars along the cruciform flexbeam body to further optimize torsion softness of the flexbeam.

According to a further preferred embodiment of the invention supplemental rovings are provided for completion of layers at the flexbeam head and to further reduce tensions at the interfaces of the layers and for more flexibility with regard to the geometry of the flexbeam head and/or flexbeam body.

BRIEF DESCRIPTION OF THE SEVERAL VIEWS OF THE DRAWINGS

In order that the invention may be clearly understood it will now be described in connection with preferred example embodiments, with reference to the accompanying drawings, wherein:

FIG. 6 is a cross sectional view of molds assembled for provision of the partly cruciform flexbeam of FIG. 1, and FIG. 7 is an exploded view before assembly of the partly cruciform flexbeam of FIG. 1.

DETAILED DESCRIPTION OF THE INVENTION

Figure 1:
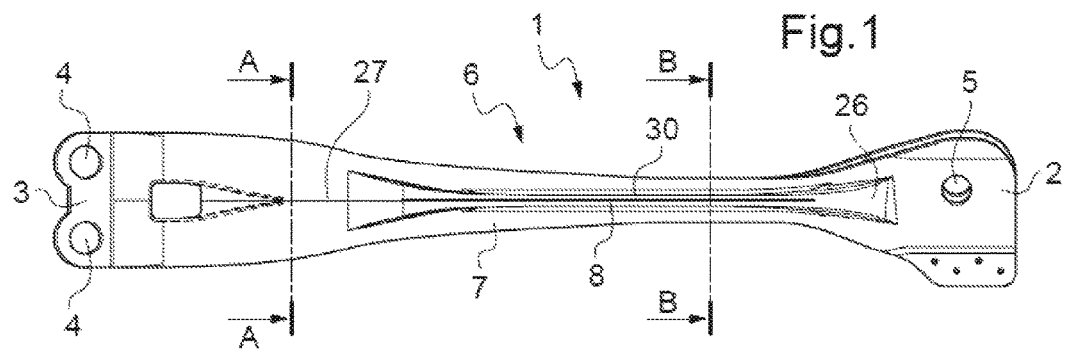
FIG. 1 is a view from the top on a partly cruciform flexbeam according to the invention.
Figure 2:
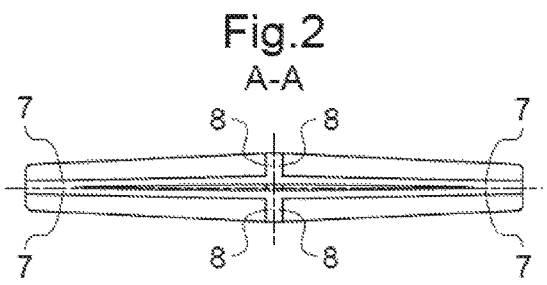
FIG. 2 is a cross sectional view of the partly cruciform flexbeam of FIG. 1.
Figure 3:
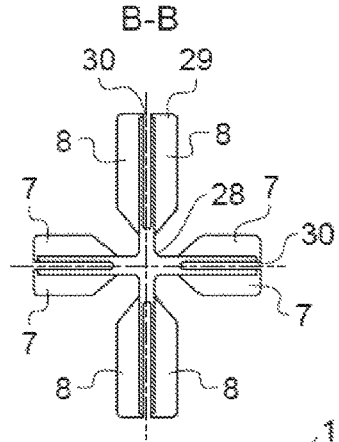
FIG. 3 is a further cross sectional view of the partly cruciform flexbeam of FIG. 1.
Figure 4:
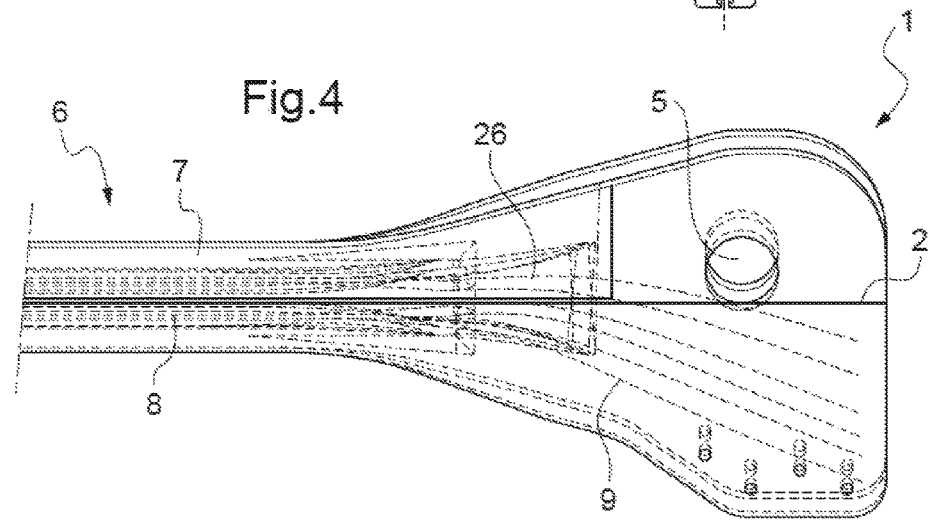
FIG. 4 is a view from the top on a section of the partly cruciform flexbeam of FIG. 1.

According to FIGS. 1-4 a partly cruciform flexbeam 1 of a bearingless main rotor system (not shown) of a helicopter is made of composite material. The partly cruciform flexbeam 1 comprises a flexbeam head 2 of a flat bearing laminate at one end and a root end 3 opposed to said flexbeam head 2. Said root end 3 is provided with two borings 4 for bolts (not shown) for a releasable connection to a hub drive (not shown) and said flexbeam head 2 is provided with a further boring 5 for a bolt (not shown) for a releasable connection to an airfoil blade (not shown).

A torsion soft flexbeam body 6 between said flexbeam head 2 and said root end 3 has a substantially cruciform cross section of bars 7 and fillets 8, said torsion softness without centrifugal forces being smaller than 3 Nm/m°. Said bars 7 are integral with and essentially perpendicular to said fillets 8 and said bars 7 are in line with said flat flexbeam head 2. The cross section of the flexbeam body 6 towards said root end 3 is large between 120-250 mm and low between 10-40 mm while the cross section of the flexbeam body 6 towards said flexbeam head 2 is high between 60-120 mm and small between 40-90 mm. The cross sections of the partly cruciform flexbeam 1 vary continuously towards said flat flexbeam head 2 and said root end 3 along the cruciform flexbeam body 6.

Said flexbeam body 6 is assembled of four bars 7 and four fillets 8 by aligning said four bars 7 along their respective faces to each other and said four fillets 8 along their respective faces to each other to said substantially cruciform cross section along a longitudinal middle axis 27 of the partly cruciform flexbeam 1. Each of the four bars 7 and four fillets 8 of said flexbeam body 6 have respectively essentially rectangular cross sections towards said root end 3 while each of the four bars 7 and four fillets 8 towards said flexbeam head 2 have respectively essentially small rectangular cross sections 28 next to the longitudinal middle axis 27 of said substantially cruciform cross section and widened quadrilateral cross sections 29 towards their respective peripheries. Central separations 30 are in between each of the widened quadrilateral cross sections of said fillets 8 and said bars 7 from the respective peripheries towards said longitudinal middle axis 27 of said flexbeam body 6.

The cruciform cross section is essentially symmetric with regard to a plane of contact between the bars 7 and symmetric with regard to a plane of contact between the fillets 8. Said fillets 8 and said bars 7 are composed of a plurality of rovings 9, said plurality of rovings 9 extending all along from the root end 3 to the flexbeam head 2 along said flexbeam body 6. From said central separations 30 said fillets 8 further diverge from each other and turn towards said flexbeam head 2 in a transition area 26 between flexbeam body 6 and said flexbeam head 2. The plurality of rovings 9 essentially comprises unidirectional fibers.

The rovings 9 of the fillets 8 and the bars 7 extend beyond the cruciform flexbeam body 6 and are respectively scarfed or hafted to layers covering at least partly the flexbeam head 2. Supplemental rovings are provided for completion of the layers in the flexbeam head 2, with some of said supplemental rovings extending along the rovings 9 into the flexbeam body 6 while remaining in the plane of the flexbeam head 2.

Figure 5:
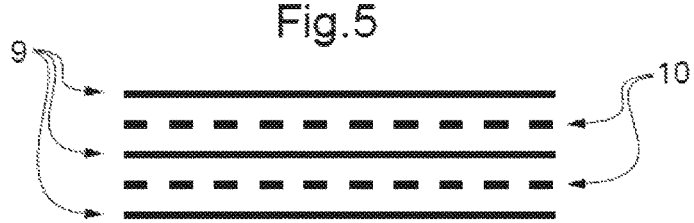
FIG. 5 is a schematic view of a detail of the partly cruciform flexbeam of FIG. 1.

According to FIG. 5 corresponding features are referred to with the references of FIG. 1-4. The flexbeam head 2 of flat bearing laminate is composed of the layers of the unidirectional rovings 9 with L-shaped tissue layers 10 in between. Said L-shaped tissue layers 10 are integrally formed covering the entire length along the longitudinal middle axis 27 and up to the entire width of the flexbeam head 2. Said L-shaped tissue layers 10 extend with an essentially rectangular part into the flexbeam body 6 while remaining in the plane of the flexbeam head 2. Said L-shaped tissue layers 10 extend differently along the width of the flat bearing head 2 and differently along the essentially rectangular part into the flexbeam body 6 resulting in a scale-type arrangement of rovings 9, supplemental rovings and L-shaped tissue layers 10.

Method of Manufacturing the Partly Cruciform Flexbeam

According to FIG. 6 corresponding features are referred to with the references of FIG. 1-5. For one partly cruciform flexbeam 1 four mold quarters 11-14 are provided, each with a mold for a bar 7 and with a mold for a fillet 8 of the cruciform flexbeam body 6. Said mold of each of said four mold quarters 11-14 for a bar 7 is integral and essentially perpendicular to said mold for a fillet 8 and said mold for a bar 7 is essentially in line with said flat flexbeam head 2. A pair of mold quarters 11-12 is held by screws 15, 16 in a top casing 17 and a further pair of mold quarters 13-14 is held by screws 18-20 in a bottom casing 21. Said four mold quarters 11-14 are assembled with their respective molds for bars 7 directed towards each other and with their respective molds for fillets 8 directed towards each other, providing at the interface of said assembly an open space with outer peripheries corresponding respectively to the bars 7 and fillets 8 of the cruciform cross sections for flexbeam body 6 shown in FIGS. 2, 3.

Separation means 22-25 are provided between the four molds 11-14 said separation means 22-25 projecting from outside centrally into the open space.

To manufacture the partly cruciform flexbeam 1 with the cruciform flexbeam body 6, the flat flexbeam head 2 and the root end 3 L-shaped integral tissue layers 10 are provided, said L-shaped integral tissue layers 10 corresponding to the entire length and up to the entire width of the flat flexbeam head 2. Further provided are the rovings 9 with a length allowing coverage from at least beyond the separations along said fillets 8 of the flexbeam body 6 across said entire flexbeam head 2. Said rovings 9 are inserted into pairs of said still separated mold quarters 11-14 to respectively mold the two fillets 8 of a half of the cruciform flexbeam body 6.

Said pairs of mold quarters 11-14 are respectively joint along said inserted fillets 8 with said separation means 22, 24 in between the fillets 8 along the longitudinal middle axis 27 of the cruciform flexbeam body 6 to respectively provide a common mold of a pair of mold quarters 11-14 for the bars 7 of said halves of the cruciform flexbeam body 6.

Rovings 9 are respectively inserted with the direction of the longitudinal middle axis 27 in the common mold of a pair of mold quarters 11-14 for the bars 7 of each of said pairs of joint mold quarters 11-14 to respectively mold the bars 7 integral and perpendicular to the fillets 8 of the halves already molded for the cruciform flexbeam body 6.

Respectively two of said pairs of joint mold quarters 11-14 are joint along said bars 7 of said flexbeam body 6 and at the flexbeam head 2 along said scarfed rovings 9 from said bars 7 and/or said fillets 8 from said flexbeam body 6 and/or said intermediate L-shaped integral tissue layers 10 of said flexbeam head 2 in said respectively joint pairs of mold quarters 11-14.

According to FIG. 7 corresponding features are referred to with the references of FIG. 1-6. Each of the mold quarters 11-14 provide one quarter of the partly cruciform flexbeam 1 with each of said quarters having a bar 7 and a fillet 8 of the cruciform flexbeam body 6 along the longitudinal middle axis 27 between the flexbeam head 2 and the root end 3.

The rovings 9 of the fillets 8 and the bars 7 of each of said pairs of joint mold quarters 11-14, extending beyond the cruciform flexbeam body 6 are respectively scarfed or hafted to layers covering differently the flexbeam head 2. The L-shaped integral tissue layers 10 inserted alternately between the scarfed rovings 9 of the fillets 8 and bars 7 cover differently the flexbeam head 2. For purposes of illustration of the L-shape of the layers 10, a single inner L-shaped integral tissue layer 31 is shown in dotted lines.

Together with the supplemental rovings in between the L-shaped integral tissue layers 10 and in between the scarfed rovings 9, covering differently the flexbeam head 2, the L-shaped integral tissue layers 10 and the scarfed rovings 9 form the flexbeam head 2 and the flexbeam body 6 to different heights along the flexbeam 1.

REFERENCE LIST

1 flexbeam
2 flexbeam head
3 root end
4 boring
5 further boring
6 flexbeam body
7 bars
8 fillets
9 rovings
10 layers of tissue
11-14 mold quarters
15, 16 screws
17 top casing
18-20 screws
21 bottom casing
22-25 separation means
26 transition area
27 longitudinal middle axis
28 rectangular cross section
29 quadrilateral cross sections
30 central separations
31 inner L-shaped integral tissue layer

What is claimed is:

1. A partly cruciform flexbeam of a bearingless main rotor system of a helicopter with a hub drive and an airfoil blade, said partly cruciform flexbeam comprising:
    a flexbeam head with a flat bearing laminate at one end, the flexbeam head being adapted for releasable connection to the airfoil blade;
    a root end, the root end being opposed to the flexbeam head, the root end being adapted for releasable connection to the hub drive, and
    a flexbeam body between the flexbeam head and the root end, the flexbeam body being torsion soft with a substantially cruciform cross section, the substantially cruciform cross section of the flexbeam body comprising bars and fillets, the bars being integral with and essentially perpendicular to the fillets and the bars being in line with the flexbeam head, the flexbeam body being assembled along the respective bars and fillets to the substantially cruciform cross section with separations at least along the fillets, wherein
    the fillets and the bars include a plurality of rovings, the plurality of rovings extending from at least beyond the separations along the fillets of the flexbeam body and along the flexbeam head, and
    at least two L-shaped integral tissue layers extending from in between of the flexbeam body up to an entire width of the flexbeam head with the rovings in between at the flexbeam head, wherein the at least two L-shaped integral tissue layers are alternating with the rovings of the flexbeam head and/or with supplemental rovings.

2. The partly cruciform flexbeam according to claim 1, wherein the rovings from the fillet and the bar are scarfed and/or hafted towards an entire width of the flexbeam head.

3. The partly cruciform flexbeam according to claim 1, wherein the at least two L-shaped integral tissue layers are formed integrally.

4. A method of manufacturing a partly cruciform flexbeam of a bearingless main rotor system, said system comprising the steps of:
    providing at least two L-shaped integral formed tissue layers;
    providing four mold quarters, each with a mold for a bar and with a mold for a fillet, the mold of each of the four mold quarters for a bar being integral and essentially perpendicular to the mold for a fillet;
    providing rovings;
    inserting the rovings into pairs of separated mold quarters to respectively mold separately the two fillets of one half of a cruciform flexbeam body;
    joining respectively the pairs of mold quarters along the inserted fillets along the cruciform flexbeam body to respectively provide a common mold for the bars of one half of the cruciform flexbeam body;

inserting the rovings in the common mold for the bars of each of the pairs of joint mold quarters to respectively mold the bars of the halves of the cruciform flexbeam body;

scarfing respectively the rovings of at least the fillets of the pairs of joint mold quarters to layers extending along a flexbeam head;

inserting the L-shaped integral tissue layers between the scarfed rovings of at least the fillets of each of two joint mold quarters at the flexbeam head; and joining respectively two of the pairs of joint mold quarters along the bars of the flexbeam body and along the rovings from the bars and/or the fillets from the flexbeam body and/or L-shaped integral tissue layers of the flexbeam head in the respectively joint pairs of mold quarters, wherein at least two L-shaped integral tissue layers extending from in between of the flexbeam body up to an entire width of the flexbeam head with the rovings in between at the flexbeam head, wherein the at least two L-shaped integral tissue layers are alternating with the rovings of the flexbeam head and/or with supplemental rovings.

5. The method according to claim 4, further comprising the step of providing separations in between the bars and/or fillets along the cruciform flexbeam body before joining the respective mold quarters.

6. The method according to claim 4, further comprising the step of by providing supplemental rovings for completion of layers at the flexbeam head.

* * * * *